United States Patent
Oroskar et al.

(10) Patent No.: US 10,595,301 B2
(45) Date of Patent: Mar. 17, 2020

(54) MANAGING SIGNALING RESOURCES USING HIDDEN PUBLIC LAND MOBILE NETWORK SIGNALS

(71) Applicant: Sprint Communications Company L.P., Overland Park, KS (US)

(72) Inventors: Siddharth Oroskar, Overland Park, KS (US); Jasinder Pal Singh, Olathe, KS (US); Rajil Malhotra, Olathe, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/391,675

(22) Filed: Apr. 23, 2019

(65) Prior Publication Data

US 2019/0254005 A1  Aug. 15, 2019

Related U.S. Application Data

(63) Continuation of application No. 14/972,423, filed on Dec. 17, 2015, now Pat. No. 10,321,434.

(51) Int. Cl.
| | |
|---|---|
| *H04W 72/04* | (2009.01) |
| *H04W 68/00* | (2009.01) |
| *H04W 76/27* | (2018.01) |
| *H04W 36/06* | (2009.01) |
| *H04W 36/00* | (2009.01) |

(Continued)

(52) U.S. Cl.
CPC ....... *H04W 72/04* (2013.01); *H04W 36/0055* (2013.01); *H04W 36/06* (2013.01); *H04W 68/00* (2013.01); *H04W 76/27* (2018.02); *H04W 36/00* (2013.01); *H04W 36/0016* (2013.01); *H04W 36/0083* (2013.01); *H04W 36/00835* (2018.08); *H04W 36/14* (2013.01); *H04W 48/02* (2013.01); *H04W 48/08* (2013.01); *H04W 48/18* (2013.01); *H04W 84/042* (2013.01)

(58) Field of Classification Search
CPC . H04W 48/18; H04W 48/02; H04W 36/0083; H04W 48/08; H04W 36/14; H04W 84/042; H04W 76/007; H04W 36/00; H04W 36/0016
See application file for complete search history.

(56) References Cited

U.S. PATENT DOCUMENTS

| 8,588,738 B2 | 11/2013 | Gholmieh et al. |
| 2009/0086672 A1 | 4/2009 | Gholmieh et al. |

(Continued)

*Primary Examiner* — Jaime M Holliday

(57) ABSTRACT

A wireless access node transmits an available Public Land Mobile Network Identifier (PLMN ID) associated with available wireless channels to a wireless device. The wireless access node receives the available PLMN ID from the wireless device and responsively exchanges signals with the wireless device over the available wireless channels. The wireless access node identifies a transition condition for the wireless communication device and responsively transfers a Physical Cell Identifier (PCI) and a hidden PLMN ID to the wireless communication device. The hidden PLMN ID is associated with hidden wireless channels. The wireless access node receives the PCI and the hidden PLMN ID from the wireless communication device and responsively exchanges signals with the wireless communication device over the hidden wireless channels.

18 Claims, 11 Drawing Sheets

(51) Int. Cl.
*H04W 84/04* (2009.01)
*H04W 48/02* (2009.01)
*H04W 36/14* (2009.01)
*H04W 48/08* (2009.01)
*H04W 48/18* (2009.01)

(56) References Cited

U.S. PATENT DOCUMENTS

| | | |
|---|---|---|
| 2011/0134827 A1 | 6/2011 | Hooli et al. |
| 2011/0244851 A1* | 10/2011 | Gunnarsson ............ H04W 8/26 455/423 |
| 2012/0155377 A1 | 6/2012 | Chai |
| 2013/0084877 A1* | 4/2013 | Martin ................. H04W 72/02 455/452.1 |
| 2013/0137434 A1* | 5/2013 | Godin ............... H04W 36/0085 455/436 |
| 2015/0045038 A1 | 2/2015 | Gao et al. |
| 2016/0014616 A1 | 1/2016 | Tanaka |
| 2016/0021695 A1 | 1/2016 | Axmon et al. |
| 2016/0066235 A1 | 3/2016 | Bhat et al. |
| 2016/0135095 A1 | 5/2016 | Wu |
| 2016/0149681 A1 | 5/2016 | Vajapeyam et al. |

\* cited by examiner

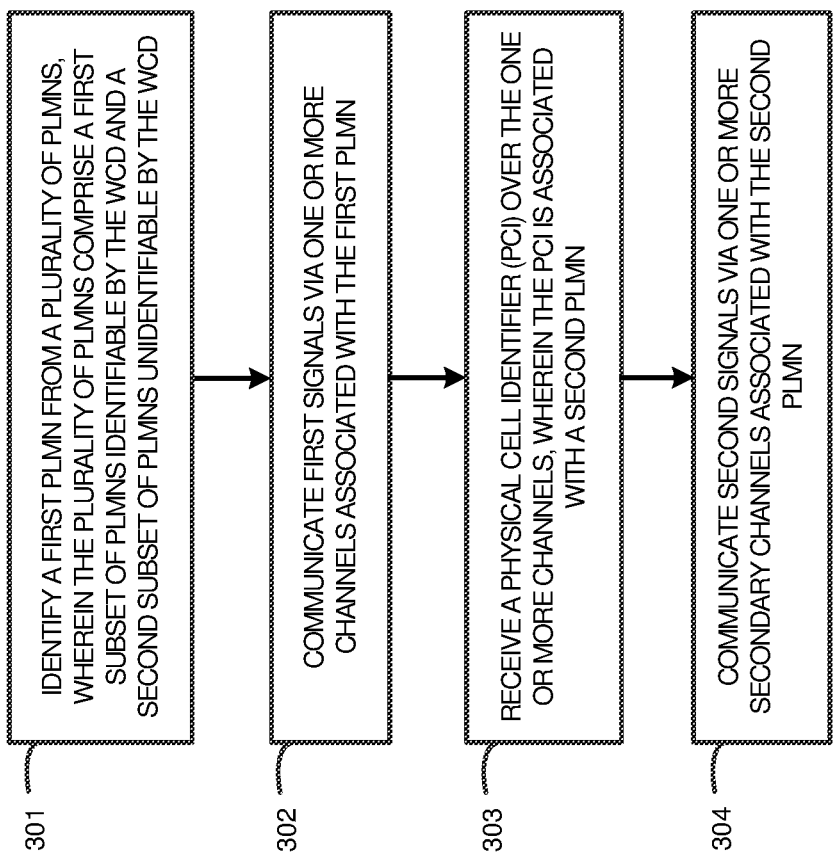

MANAGING SIGNALING RESOURCES USING HIDDEN PUBLIC LAND MOBILE NETWORK SIGNALS

RELATED CASES

This United States patent application is a continuation of U.S. patent application Ser. No. 14/972,423 that was filed on Dec. 17, 2015 and is entitled, "MANAGING SIGNALING RESOURCES USING HIDDEN PUBLIC LAND MOBILE NETWORK SIGNALS." U.S. patent application Ser. No. 14/972,423 is hereby incorporated by reference into this United States patent application.

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some Long Term Evolution (LTE) communication systems, cells of LTE access nodes may broadcast public land mobile network (PLMN) signals. These signals include information about the network that is broadcasting the signals, as well as information about the carrier or channels available within the network. As the PLMN signals are broadcast, wireless communication devices identify the signals, and compare the signals to a local data structure on the device to determine the appropriate network to join. However, although the PLMNs may assist in notifying devices of the identity of a network and the corresponding channels of the network, it becomes difficult for the service provider to preserve network resources or channels for specific network conditions.

Overview

A wireless access node transmits an available Public Land Mobile Network Identifier (PLMN ID) associated with available wireless channels to a wireless device. The wireless access node receives the available PLMN ID from the wireless device and responsively exchanges signals with the wireless device over the available wireless channels. The wireless access node identifies a transition condition for the wireless communication device and responsively transfers a Physical Cell Identifier (PCI) and a hidden PLMN ID to the wireless communication device. The hidden PLMN ID is associated with hidden wireless channels. The wireless access node receives the PCI and the hidden PLMN ID from the wireless communication device and responsively exchanges signals with the wireless communication device over the hidden wireless channels.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates a method of operating a wireless communication device to communicate via an unidentifiable public land mobile network.

TECHNICAL DISCLOSURE

Figure 1:
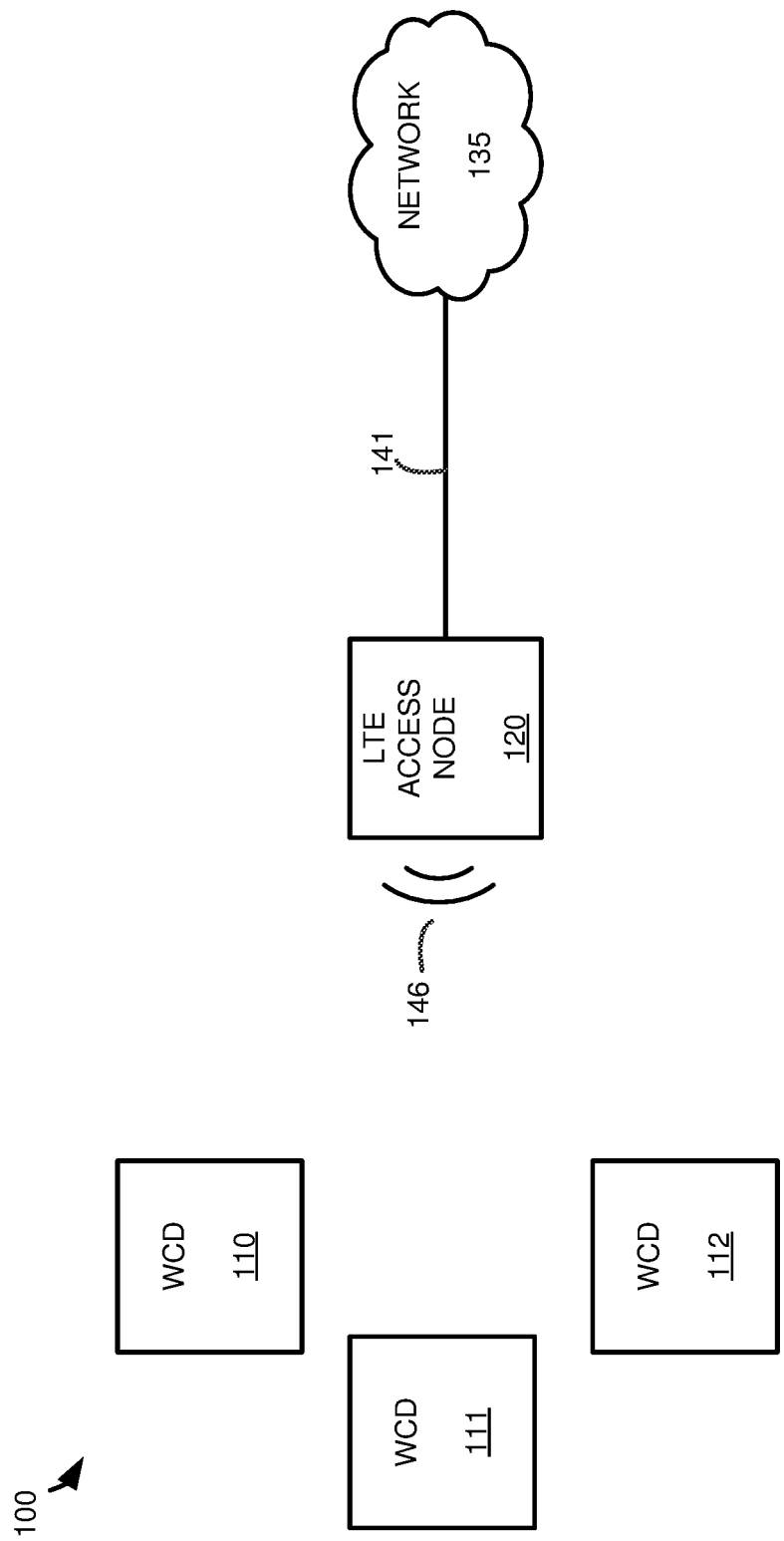
FIG. 1 illustrates a communication system to provide selective channels to wireless communication devices.

FIG. 1 illustrates a communication system 100 to provide selective channels to wireless communication devices. Communication system 100 includes wireless communication devices (WCDs) 110-112, Long Term Evolution (LTE) access node 120, and network 135. LTE access node 120 provides LTE wireless communication signaling 146 to WCDs 110-112 using at least two communication cells and at least two public land mobile networks (PLMNs). LTE access node 120 further communicates with network 135 via communication link 141. Network 135 may comprise routers and gateways for the wireless provider network, and may further comprise systems, routers, and interconnects for a packet data network, such as the internet or the Internet Protocol Multimedia Subsystem (IMS).

WCDs 110-112 each include one or more applications and processes that require communications and services over network 135. These applications may include voice applications, messaging applications, internet browser applications, gaming applications, or any other similar communication application. To provide the communications, LTE access node 120, which comprises multiple communication cells for the wireless devices, broadcasts public land mobile network (PLMNs) that identify the network provider and the channels available for communication. The WCDs receive the broadcasted PLMNs, determine whether the received PLMNs are available for the device, and select a PLMN from the available PLMNs. Once the PLMN is selected, the device may initiate an attach process to join the identified network and initiate required communications over the network.

Here, LTE access node 120 is configured to provide identifiable PLMNs to WCDs 110-112, as well as unidentifiable PLMNs to WCDs 110-112. In particular, the identifiable PLMNs comprise PLMNs that are available to be accessed by WCDs 110-112. For example, the WCDs may each include one or more data structures that can be used to determine if the identity of the PLMN is available to the WCD. In the case of the identifiable PLMNs, the WCDs may determine that the identifiable PLMNs are available for communications. In contrast, the unidentifiable PLMNs will not be included in the data structures for the WCDs, preventing the devices from joining the network via the unidentifiable PLMNs.

Once an identifiable PLMN is selected by one of the devices in WCDs 110-112, the device may attach to the LTE network provided by LTE access node 120 and initiate communications using channels associated with the identifiable PLMN. During the communication, LTE access node 120 may identify a network condition that requires one or more of the devices to be transitioned from communicating via the identifiable PLMNs to the unidentifiable PLMNs. This network condition may comprise a capacity or load on the network, a requirement of carrier aggregation for one or more of the devices, a quality of services requirement for one or more of the devices, or any other similar network condition. In response to the condition, LTE access node 120 may identify a physical cell identifier (PCI) associated with an unidentifiable PLMN and provide the PCI to a subset of the connecting devices, permitting the subset of devices to communicate with the LTE network via second communication channels associated with the unidentifiable PLMN.

Figure 2:
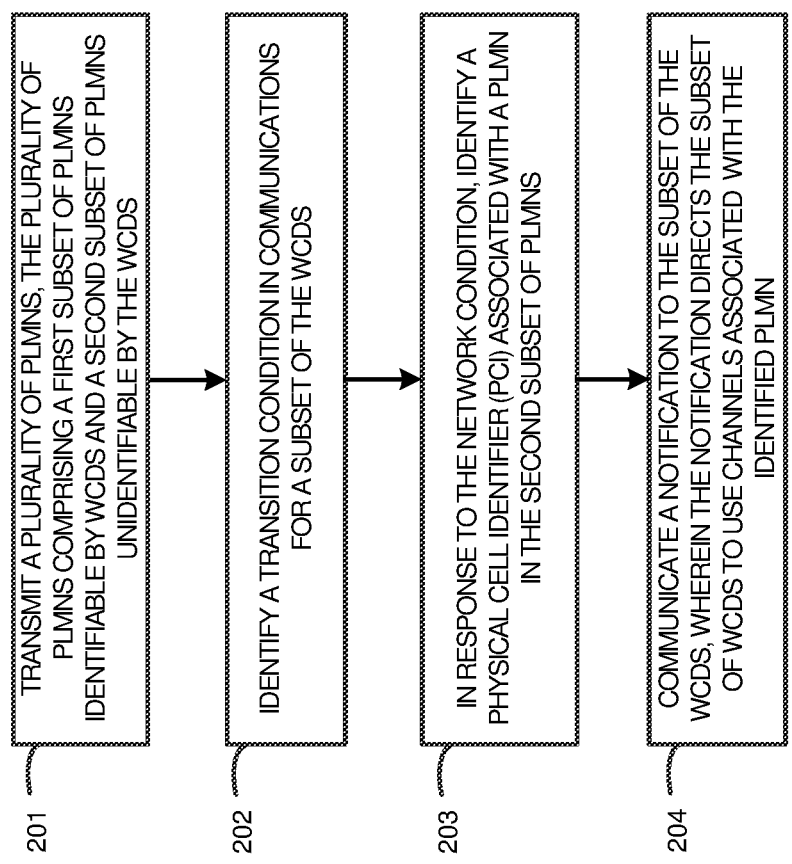
FIG. 2 illustrates a method of operating a Long Term Evolution access node to provide selective channels to wireless communication devices.

FIG. 2 illustrates a method of operating a Long Term Evolution access node to provide selective channels to wireless communication devices. The operations of FIG. 2 are referenced parenthetically in the paragraphs that follow with reference to systems and elements from communication system 100 of FIG. 1.

As described in FIG. 1, wireless devices include applications and processes that require wireless communications to perform desired operations. To provide the communications to the devices, LTE access node 120 transmits a plurality of PLMNs, wherein the plurality of PLMNs comprise a first subset of PLMNs identifiable by WCDs and a second subset of PLMNs unidentifiable by the WCDs (201). In many implementations, WCDs 110-112 will contain one or more data structures capable of comparing the PLMNs that are received to PLMNs that the device is capable or configured to use. In the present example, the PLMNs transmitted via LTE access node 120 includes a first set of PLMNs that can be identified or are accessible by WCDs 110-112, and further includes a second set of PLMNs that cannot be identified and are not accessible by WCDs 110-112.

Once the devices each select an identifiable PLMN from the first subset of PLMNs, LTE access node 120 may provide communications signaling to the devices using channels associated with the first subset of PLMNs. During the communication signals, LTE access node 120 identifies a network or transition condition in the communications for a subset of the wireless devices (202). In some implementations, the transition condition may comprise a quality of service condition for the subset of wireless devices, may comprise a requirement for carrier aggregation for the subset of wireless devices, or may comprise a load or capacity threshold, wherein the subset was selected when the load threshold was attained.

In response to the transition condition occurring for the subset of the wireless communication devices, LTE access node 120 identifies a PCI associated with a PLMN in the second subset of PLMNs (203). Once the PLMN is identified, LTE access node 120 communicates a notification to the subset of the wireless devices, wherein the notification directs the subset to use channels associated with the identified PLMN (204). In some examples, this notification may comprise an RRC Connection Reconfiguration message for the wireless device. As described previously, by providing a PLMN that is incapable of being identified by WCD 110-112, the channels associated with the PLMN may only be used when the LTE node deems the network condition requires it. Referring to an example in FIG. 1, WCD 110 may communicate with LTE access node 120 using channels associated with a first PLMN identifiable by WCD 110. During the communications using the channels, LTE access node 120 may identify a transition condition for WCD 110, wherein the condition may occur due to any of the aforementioned reasons. Responsive to determining the transition condition, LTE access node 120 will determine a PCI associated with an otherwise unidentifiable PLMN for the device and communicate the PCI to the device. This PCI may be used by the device to initiate communications with the cell that communicates channels for the unidentifiable PLMN. Accordingly, if WCD 110 required a particular quality of service, LTE access node 120 may transition WCD 110 to the channels provided by the cell with the PCI to provide the adequate quality of service.

To further demonstrate the operation of a WCD in WCDs 110-112, FIG. 3 is provided. FIG. 3 illustrates a method of operating a wireless communication device to communicate via an unidentifiable public land mobile network. The operations of FIG. 3 will be referenced parenthetically in the paragraphs that follow with reference to the systems and elements of communication system 100 of FIG. 1. In particular, the operations of FIG. 3 will be made with reference to the operations of WCD 110 of FIG. 1.

In FIG. 3, WCD 110 identifies a first PLMN from a plurality of PLMNs, wherein the plurality of PLMNs comprise a first subset of PLMNs identifiable by WCD 110 and a second subset of PLMNS unidentifiable by WCD 110 (301). To identify the various PLMNs available to the device, RF communication circuitry of the device may scan or monitor the signals transmitted from LTE access nodes, such as LTE access node 120. When a PLMN is identified from the scan, WCD 110 may compare the PLMN to a data structure located on the device to determine whether the identifier located in the PLMN is approved for communications from the device. If the PLMN is capable of providing communications then the PLMN may be considered an identifiable PLMN, however, if the PLMN is incapable of being identified using the data structures then the PLMN may be considered an unidentifiable PLMN. Once a PLMN is selected from the identifiable PLMNs, WCD 110 communicates first signals with LTE access node 120 via one or more channels associated with the identified PLMN (302). These signals may include signals to attach the device to the network and may further include data signals corresponding to applications and processes executing on the device.

During the communication of the signals, WCD 110 receives a PCI over the one or more channels, wherein the PCI is associated with a second PLMN that was unidentifiable by the WCD during the initial PLMN identification process (303). As described above in claim 2, LTE access node 120 may identify transition conditions for WCDs indicating that a subset of the WCDs should transition to using channels corresponding to an otherwise hidden PLMN. Consequently, when a network condition is met, LTE access node 120 will transmit a PCI corresponding to the new channels to the subset of WCDs. Once the PCI is received, WCD 110 will communicate second signals via one or more secondary channels associated with the second unidentifiable PLMN (304).

In some implementations, when the new PCI is provided to the device, the device may use the secondary channels to communicate using carrier aggregation. This use of carrier aggregation may permit WCD 110 to use the first communication channels associated with the identifiable PLMN, and further use the channels associated with the unidentifiable PLMN. In other implementations, rather than using both the first and second channels, it should be understood that the device may only use the second channels associated with the unidentifiable PLMN.

Figure 4A:
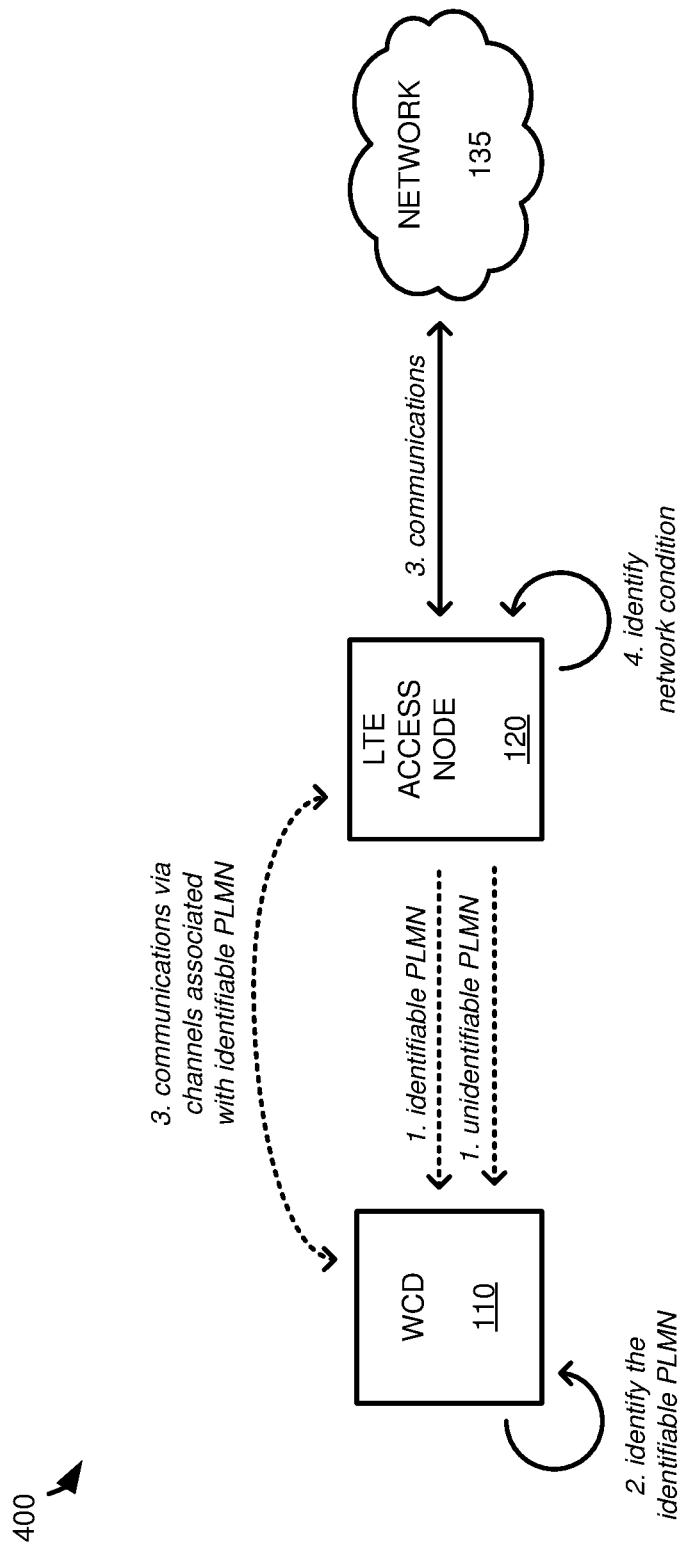
FIG. 4A illustrates an operational scenario of providing selective channels to a wireless communication device according to one implementation.

FIG. 4A illustrates an operational scenario 400 of providing selective channels to a wireless communication device according to one implementation. Operational scenario 400 includes the systems and elements from communication system 100 of FIG. 1.

As depicted in operational scenario 400, at step 1, LTE access node 120 transmits an identifiable PLMN and an unidentifiable PLMN, which are received by WCD 110. Once received, WCD 110, at step 2, identifies the identifiable PLMN as capable of providing communication services to the device. In particular, WCD 110 may include one or more data structures to determine the availability of networks for the device, wherein the PLMN received from access nodes 120 is compared against stored PLMNs that are available for the device. Once the identifiable PLMN is identified for communication signals based on the data structure, WCD 110, at step 3, exchanges communication signals with LTE access node 120 via channels associated with the identifiable PLMN. For example, LTE access node 120 may divide a spectrum available for the network into two different subsets of channels. A first subset of channels may be used my devices based on the identifiable PLMN, while a second subset of channels may be associated with the unidentifiable PLMN and only allocated to devices based on a network condition.

During the communications with WCD 110, LTE access node 120, at step 4, identifies a network condition or a transition event for WCD 110. This event may be based on the quality of service for the device, such as a quality of service associated with the application on the device, a requirement of carrier aggregation for the device, a load on the network that requires the use of additional channels for communications, or any other similar network event.

Figure 4B:
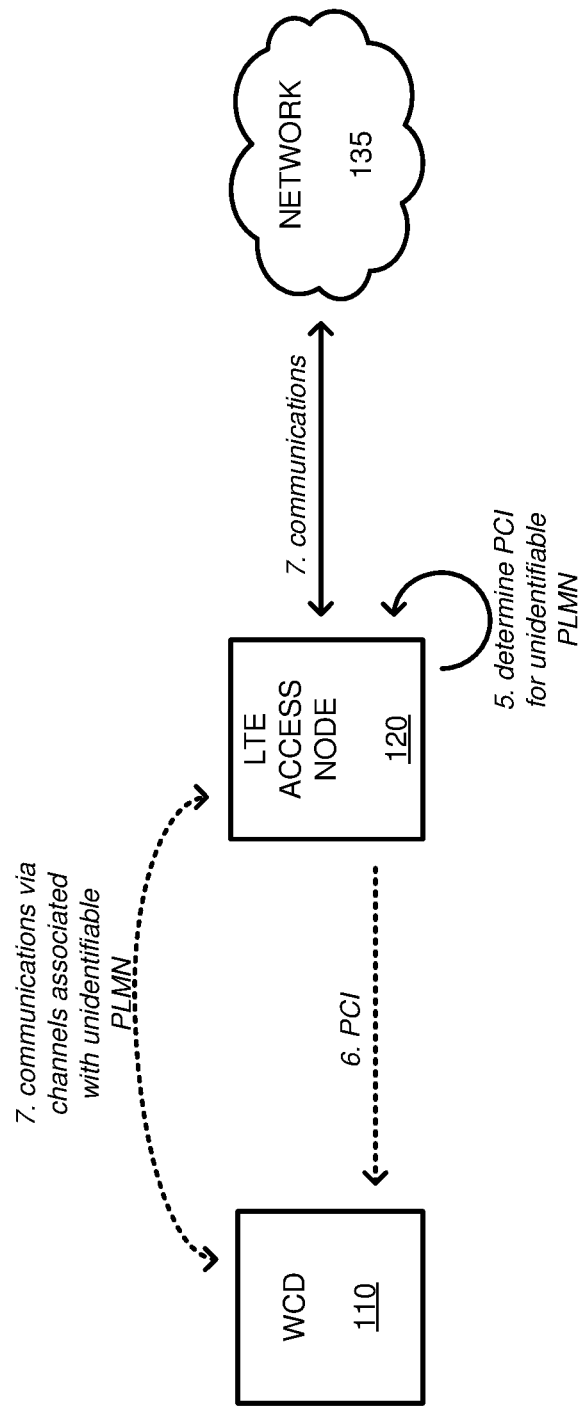
FIG. 4B illustrates an operational scenario of transitioning from a first identifiable public land mobile network to a second unidentifiable public land mobile network.

Referring now to FIG. 4B, FIG. 4B illustrates an operational scenario 401 of transitioning from a first identifiable public land mobile network to a second unidentifiable public land mobile network. Operational scenario 401 is a continuation of the operations described in operational scenario 400 in FIG. 4A, and also includes the systems and elements from communication system 100 of FIG. 1.

Continuing the operations of communication system 100 from FIG. 4A, once the network condition is identified, LTE access node 120 determines a PCI for the unidentifiable PLMN at step 5. In particular, once the communication is initiated for WCD 110, the device no longer searches for available PLMNs for the communication. Consequently, to provide additional channels to WCD 110, LTE access node 120 will identify and transfer, at step 6, a PCI associated with the additional channels to WCD 110. Once the PCI is provided to WCD 110, WCD 110 communicates with LTE access node 120, at step 7, via channels associated with the unidentifiable PLMN.

In some implementations, the addition of the channels associated with the unidentifiable PLMN permit the device to communicate using both the unidentifiable PLMN channels and the identifiable PLMN channels. For example, if the device were associated with a requirement for carrier aggregation, the device may use both the channels associated with the identified PLMN and the unidentified PLMN. This addition of channels provides a greater amount of bandwidth for the device to complete the required communications.

Figure 5A:
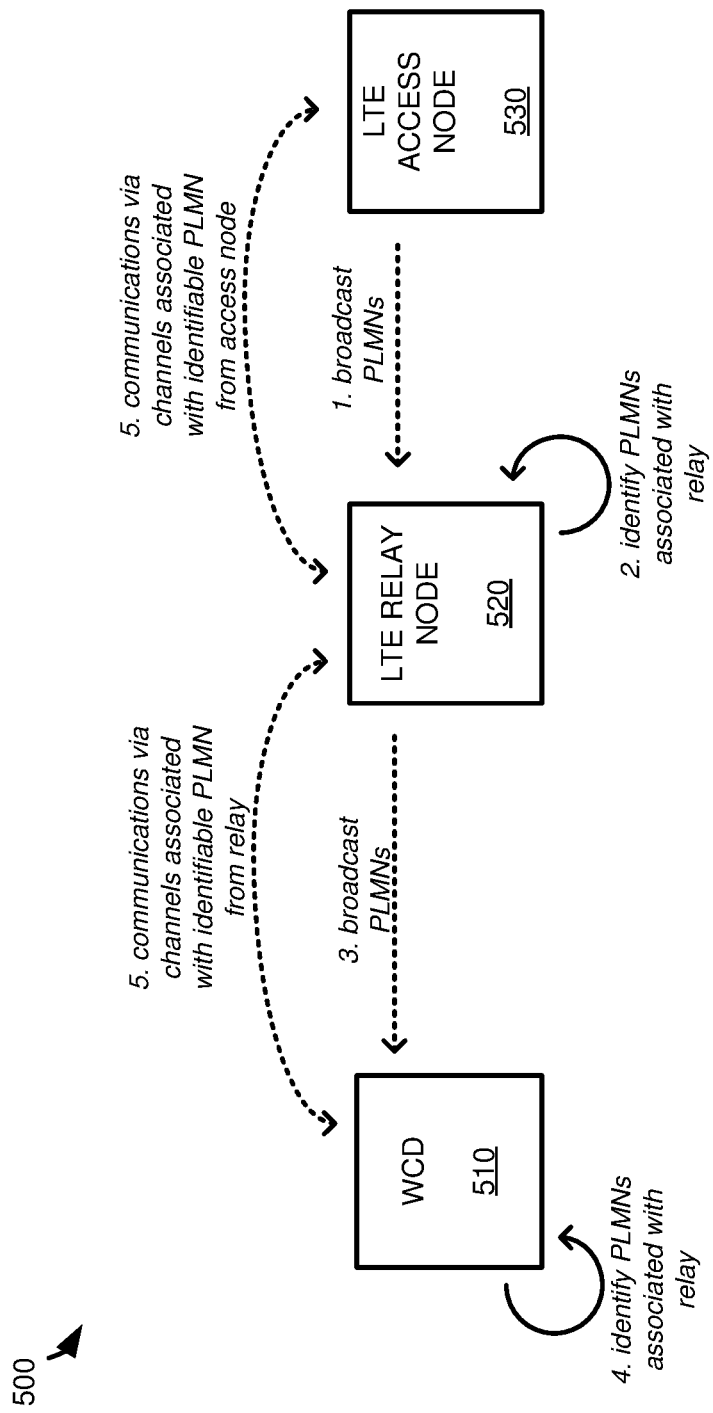
FIG. 5A illustrates an operational scenario of providing selective channels using a Long Term Evolution access node and a Long Term Evolution relay node according to one implementation.

FIG. 5A illustrates an operational scenario 500 of providing selective channels using an LTE access node and a Long Term Evolution relay node according to one implementation. Operational scenario 500 includes WCD 510, LTE relay node 520, and LTE access node 530. Operational scenario 500 is an example of providing selective channels to relay nodes and end wireless devices using identifiable and unidentifiable PLMNs.

Here, LTE access node 530 broadcasts PLMNs to LTE relay node 520 at step 1. Similar to the operations described in FIGS. 1-4, these PLMNs include identifiable PLMNs capable of being recognized by LTE relay node 520 and other possible wireless devices, and also include unidentifiable PLMNs incapable of being recognized by LTE relay node 520 and other possible wireless devices. In the present example, rather than being received by an end user device, the identifiable PLMNs are received by a relay node configured to further forward communications to one or more end WCDs. In particular, LTE relay node 520 may provide boosted signal strength to at least a subset of wireless devices. As a result, LTE relay node 520 is configured to receive the broadcasted PLMNs by LTE access node 530 and identify the available PLMNs to the relay node at step 2. Once the available PLMNs are received and identified, LTE relay node 520, at step 3, broadcasts second PLMNs to the end wireless devices. These PLMNs may further include identifiable PLMNs and unidentifiable PLMNs for the end wireless devices, however, in some examples, LTE relay node 520 will only broadcast PLMNs available to WCD 510. In some implementations, the PLMNs transmitted by LTE relay node 520 may comprise different sets of channels and PLMNs than the PLMN that is used between LTE relay node 520 and LTE access node 530. For example, LTE relay node 520 may receive multiple identifiable PLMNs from LTE access node 530. A first PLMN from the identifiable PLMNs may then be used for the communication between LTE relay node 520 and LTE access node 530, and a second PLMN from the identifiable PLMNs may be provided to devices associated with LTE relay node 520.

Once an identifiable PLMN is provided to WCD 510, WCD 510 may identify the available PLMN, at step 4, and attach to the LTE network via LTE relay node 520 and LTE access node 530. After attaching to the network, WCD 510 may initiate the required communications over the network at step 5. These communications may include voice communications, messaging communications, video communications, streaming communications, or any other similar communication.

Figure 5B:
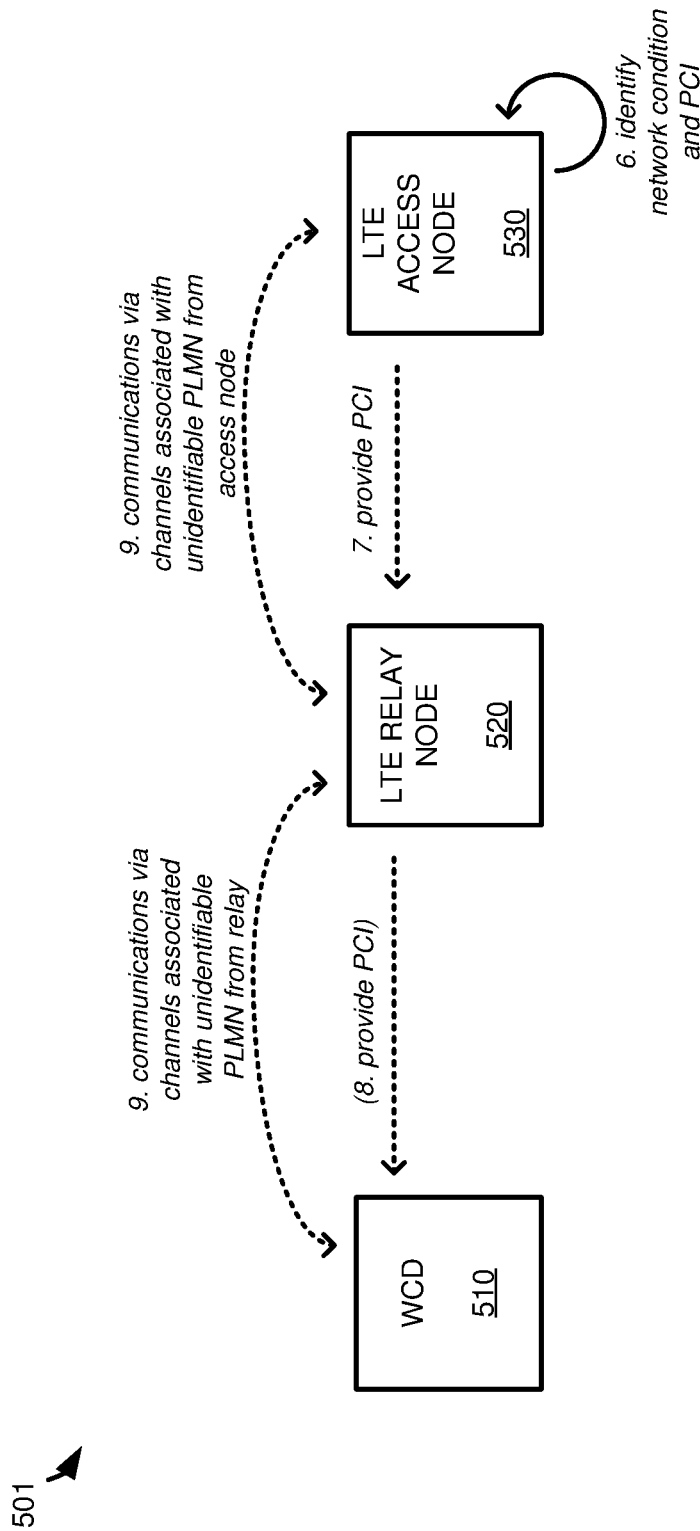
FIG. 5B illustrates an operational scenario of providing selective channels using a Long Term Evolution access node and a Long Term Evolution relay node according to one implementation.

Referring now to FIG. 5B, FIG. 5B illustrates an operational scenario 501 of providing selective channels using an LTE access node and an LTE relay node according to one implementation. Operational scenario 501 is a continuation of the operations described in operational scenario 500 of FIG. 5A and includes the same systems and elements.

During the communications for WCD 510, LTE access node 530 is configured to monitor the network conditions of the end user devices and LTE relay node 520. These network conditions may include the load on the network, the quality of service that is to be provided to WCD 510, a carrier aggregation requirement for WCD 510, or some other determination. Once a network condition meets particular criteria at step 6, such as a predefined network load, LTE access node 530 may identify a PCI associated with an unidentifiable PLMN and transfer, at step 7, the PCI to LTE relay node 620. This PCI permits LTE relay node 520 to use channels that were otherwise unidentifiable when scanning for the original PLMN.

Here, once the PCI is provided to LTE relay node 520, LTE relay node 520, at step 8, further provides a second PCI to WCD 510 associated with a new set of channels for WCD 510. This PCI may comprise an identifier for a secondary cell on LTE relay node 520 associated with an unidentifiable PLMN broadcast by LTE relay node 520. For example, in addition to the PCI indicating the change in cell for LTE relay node 520 to use with LTE access node 530, LTE access node 530 may further provide an indication that WCD 510 should also be provided with a new set of channels for the communication. Consequently, based on the indication, LTE relay node 520 may identify a PCI associated with the new set channels, and provides the new PCI to the device. Although a new set of channels are provided to WCD 510 in the present example, it should be understood that WCD 510 may use the same channel set when LTE relay node is provided with the second set of channels. Once the PCI is provided to WCD 510, WCD 510 may continue the required communications using the new channels over LTE relay node 520 and LTE access node 530 at step 9.

Figure 6:
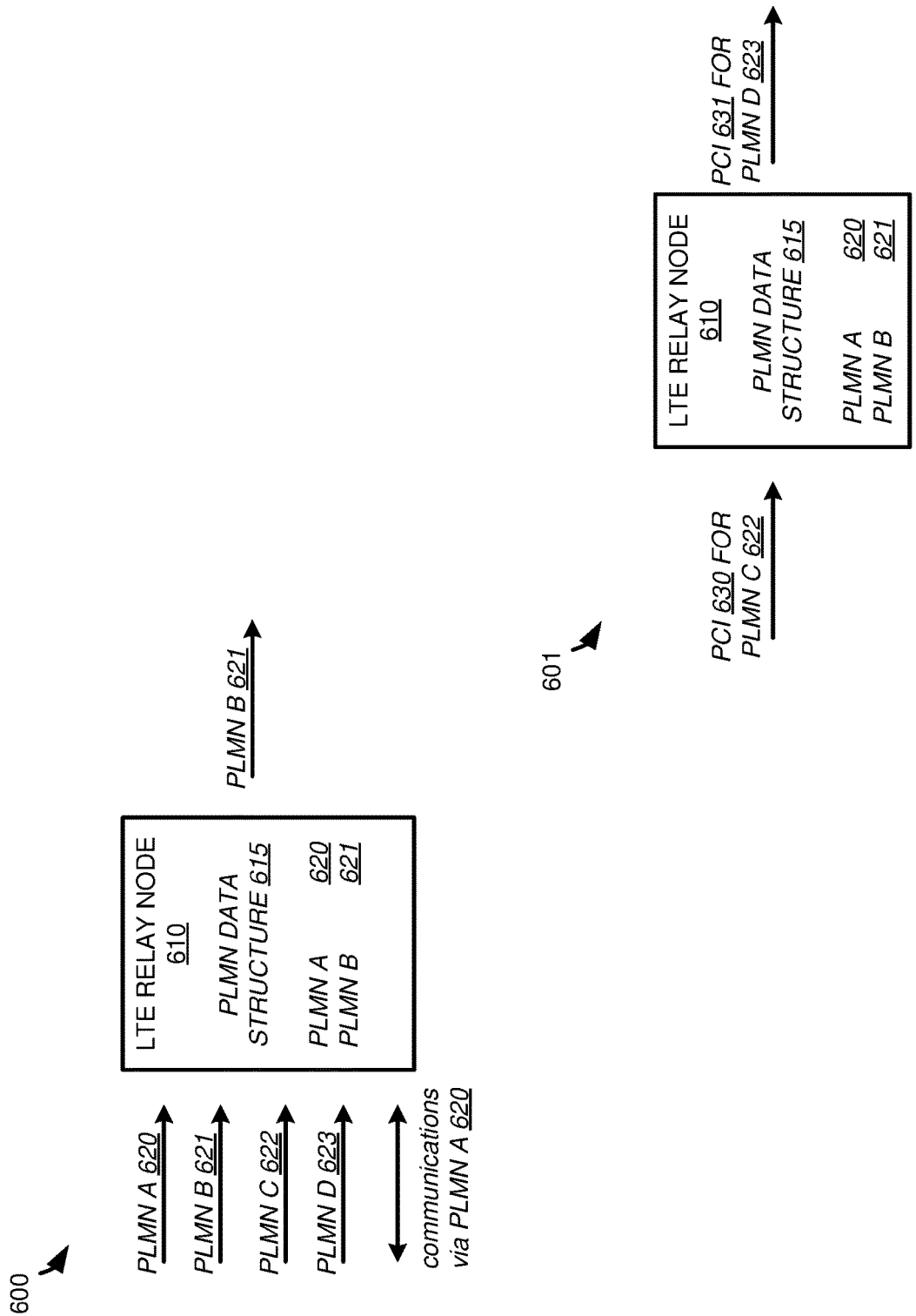
FIG. 6 illustrates overviews of selecting a public land mobile network on a Long Term Evolution relay node according to one implementation.

FIG. 6 illustrates overviews 600 and 601 of selecting a public land mobile network on an LTE relay node according to one implementation. FIG. 6 includes LTE relay node 610, PLMN data structure 615, PLMNs 620-623, and PCIs 630-631. Although illustrated with four PLMNs in the present example, it should be understood that any number of identifiable and unidentifiable PLMNs may be broadcast to an LTE relay node or end wireless device.

Here, LTE relay node 610 is configured to monitor RF signals from LTE access nodes to relay LTE communications to other end user devices. In the example of overview 600, LTE relay node 610 receives four PLMNs 620-623, wherein PLMN A 620 and PLMN B 621 comprise identifiable PLMNs, and PLMN C 622 and PLMN D 623 comprise unidentifiable PLMNs based on PLMN data structure 615. As the PLMNs are received, LTE relay node 610 may attach to the LTE network using channels associated with the identifiable PLMNs. Here, LTE relay node 610 attaches to the network using channels associated with PLMN A 620, and once attached, provides PLMN B 621 to end wireless devices capable of connecting to the LTE network via LTE relay node 610. In some implementations, LTE relay node 620 may be configured to provide predefined PLMNs and carriers to connecting devices. However, in other examples, LTE relay node 610 may provide PLMNs and carriers to connecting devices based on the PLMNs made available by the LTE access node. For example, because both PLMN A 620 and PLMN B 621 were available to the relay node, the relay node may use a first PLMN for communications with the LTE access node, while the other PLMN is provided to the end devices.

Once the relay communications are initiated between connecting end wireless devices and the LTE access node, the LTE access node may monitor network conditions for the end wireless devices. These network conditions may include the load on the currently used channels for the communications, the quality of service required for the end user devices, a carrier aggregation requirement for the end user devices, or some other network condition. Once the network condition meets defined criteria, the LTE access node may transmit a PCI associated with one of the hidden PLMNs. Referring to the example in FIG. 6, the LTE access node transmits PCI 630 for PLMN C 622, wherein the transfer permits LTE relay node 610 to use channels associated with PLMN C 622. Further, in the present example, once PCI 630 is obtained, LTE relay node 610 provides a second PCI 631 for PLMN D 623, permitting the end wireless devices coupled to LTE relay node 610 to communicate using channels associated with PLMN D 623.

In some implementations, the LTE access node may notify LTE relay node 610 to transmit PCI 631. For instance, when PCI 630 is transmitted to the relay node to transition the relay node to using channels associated with PLMN C 622, the LTE access node may also provide a notification for LTE relay node 610 to transmit PCI 631 to connected end wireless devices. In other implementations, rather than being provided with the notification from the LTE access node, LTE relay node 610 may make a determination based on the network conditions applying to the devices. For example, when transitioning to PLMN C 622, LTE relay node 610 may also determine that a transition is required for the connected end user devices and provide the devices with a PCI for a hidden PLMN available on the relay node. As a result, PCI 631, which is provided to the end user devices, may be supplied by the LTE access node based on a network condition, or may be determined by LTE relay node 610 in response to the network condition.

Figure 7:
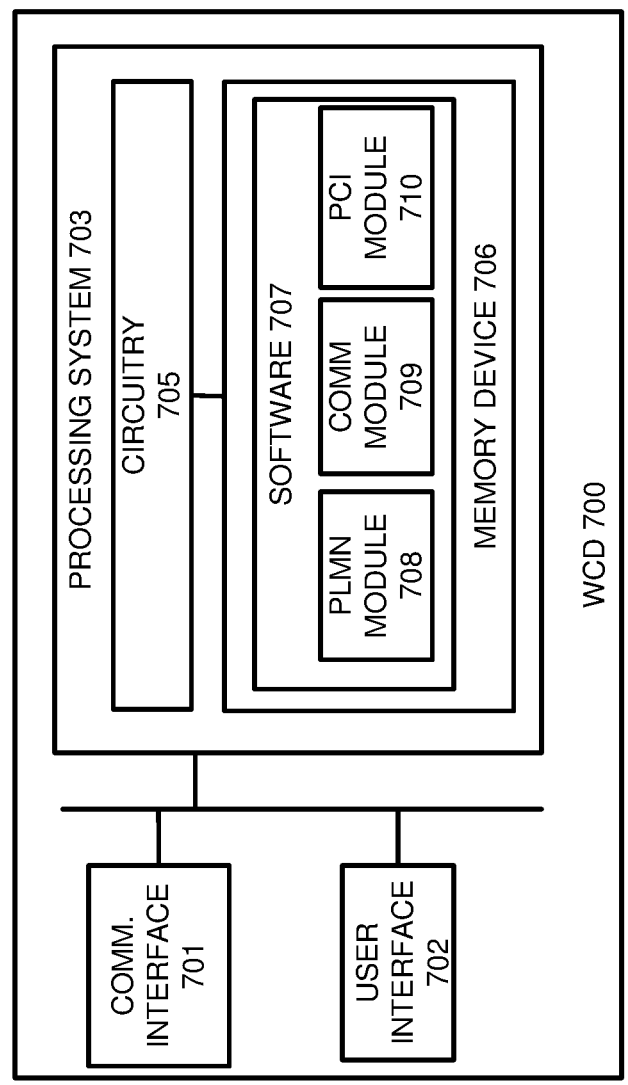
FIG. 7 illustrates a wireless communication device capable of communicating via identifiable and unidentifiable public land mobile networks.

FIG. 7 illustrates a wireless communication device 700 to dynamically adjust target block error rates for a communication. WCD 700 is representative of any computing system or systems with which the various operational architectures, processes, scenarios, and sequences disclosed herein for a WCD may be implemented. WCD 700 is an example of WCD 110 and 510, although other examples may exist. WCD 700 comprises communication interface 701, user interface 702, and processing system 703. Processing system 703 is linked to communication interface 701 and user interface 702. Processing system 703 includes processing circuitry 705 and memory device 706 that stores operating software 707. WCD 700 may include other well-known components such as a battery and enclosure that are not shown for clarity.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to provide wireless signaling with wireless access nodes of an LTE wireless network.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes PLMN module 708, communication (comm) module 709, and PCI module 710, although any number of software modules may provide the same operation. Operating software 707 may further include an operating system, utilities, drivers, network interfaces, applications, or some other type of software. When executed by processing circuitry 705, operating software 707 directs processing system 703 to operate WCD 700 as described herein.

In at least one implementation, PLMN module 708 directs processing system 703 to scan channels of the wireless frequency spectrum for PLMN signals from LTE access nodes. During the scan of the wireless frequency spectrum, PLMN module 708 further directs processing system 703 to determine if any of the PLMN signals are available or identifiable for the device. For example, WCD 700 may include at least one data structure, such as a table, an array, a linked list, or some other data structure capable of maintaining information about available PLMNs. Once an identifiable PLMN is determined from the data structure, communication module 709 may initiate an attach process to join the LTE network, and start communication signaling with the associated LTE access node.

During the communications, the LTE access node may monitor the condition of the network and redirect a subset of wireless devices communicating with the access node to an alternative PLMN. To provide this operation, the LTE access node will identify a PCI associated with the PLMN and transmit the PCI to the subset of wireless devices. In the present example, PCI module 710 directs processing system 703 to receive the PCI from the LTE access node, and continue the communications using channels associated with the received PCI. In some implementations, WCD 700 may exclusively use the new channels associated with the received PCI for the communication. However, in other implementations, WCD 700 may use channels from the original PLMN and the received PCI to provide carrier aggregation communications for the device.

Although illustrated in the example of FIG. 7 as an end wireless device, it should be understood that the wireless device may comprise an LTE relay node configured to act as an intermediary between a macro LTE access node and the end wireless devices. To provide this operation, the WCD 700 may identify available PLMNs, and attach to the LTE network using the identifiable PLMNs. Once attached, WCD 700 may provide a second set of PLMNs to the end wireless devices permitting the end devices to communicate with the LTE network over the relay node. Further, based on network conditions identified by the LTE access node, channels for communication with the LTE access node may be modified via PCIs that are provided from the LTE access node, which are associated with previously unidentifiable PLMNs. Further, WCD 700 may identify PCIs associated with alternative PLMNs for the end wireless devices and provide the PCIs to the devices based on network conditions for the devices.

Figure 8:
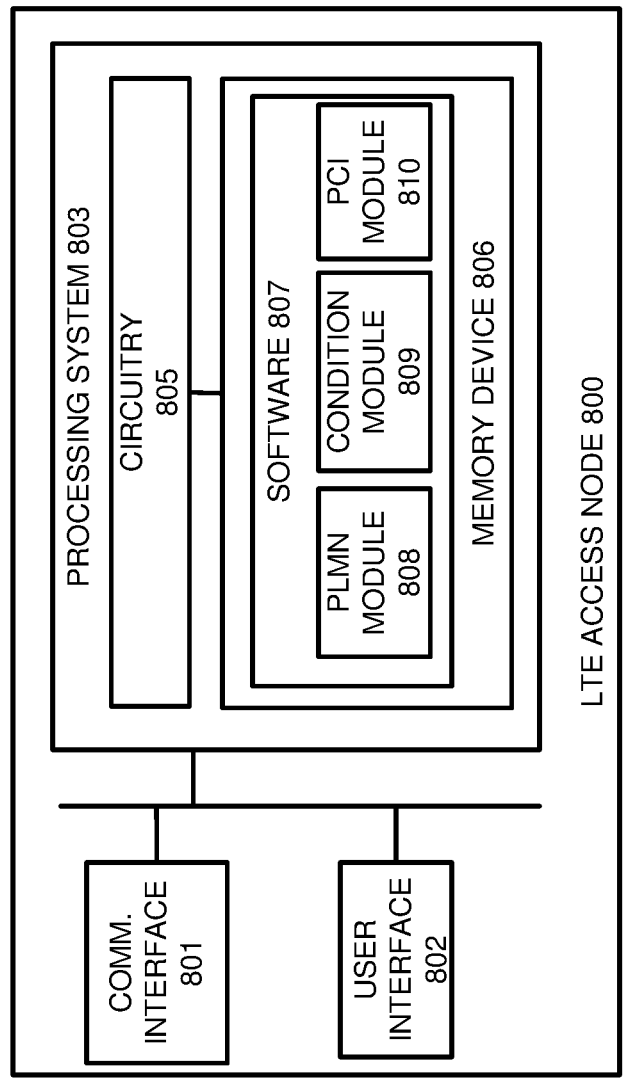
FIG. 8 illustrates a Long Term Evolution access node to provide selective channels to wireless communication devices.

FIG. 8 illustrates an LTE access node 800 to dynamically adjust target block error rates for communicating wireless communication devices. LTE access node 800 is representative of any computing system or systems with which the various operational architectures, processes, scenarios, and sequences disclosed herein for an LTE access node may be implemented. LTE access node 800 is an example of LTE access node 120 and 520, although other examples may exist. LTE access node 800 comprises communication interface 801, user interface 802, and processing system 803. Processing system 803 is linked to communication interface 801 and user interface 802. Processing system 803 includes processing circuitry 805 and memory device 806 that stores operating software 807. LTE access node 800 may include other well-known components such as a battery and enclosure that are not shown for clarity.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 may be configured to provide wireless signaling services to connecting wireless devices and may further communicate with routers and gateways of the LTE network to provide the desired services.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes PLMN module 808, condition module 809, and PCI module 810, although any number of software modules may provide the same operation. Operating software 807 may further include an operating system, utilities, drivers, network interfaces, applications, or some other type of software. When executed by processing circuitry 805, operating software 807 directs processing system 803 to operate LTE access node 800 as described herein.

In at least one example, PLMN module 808 directs processing system 803 to broadcast PLMNs to wireless communication devices, wherein the PLMNs include a subset of identifiable PLMNs for wireless devices and a subset of unidentifiable PLMNs for the wireless devices. As the PLMNs are broadcast, wireless devices may attach and exchange communication signals with LTE access node 800 using channels associated with the identifiable PLMNs. During the communications, condition module 809 directs processing system 803 to identify a transition event for a subset of the wireless devices communicating with LTE access node 800 to transition to one of the unidentifiable PLMNs. This transition event may be based on the load or capacity of the network meeting capacity criteria, a quality of service for the subset of devices meeting quality criteria, a subset of devices requiring carrier aggregation, or some other similar transition event. Referring to the load or capacity criteria example, condition module 809 may direct processing system 803 to identify that a load condition is present over the communication channels and, in response to the load condition, identify a subset of devices to transition to a hidden PLMN. These devices may be identified using a random algorithm or may be identified based on a quality of service associated with the devices and communications. For instance, devices with the higher quality of service may be migrated to the hidden PLMN which may be capable of providing a higher or better quality of service.

After the transition event occurs and the subset of devices is identified, PCI module 810 directs processing system 803 to identify a PCI associated with an unidentifiable PLMN and provide the PCI to the subset of devices. This PCI corresponds to a cell of the network providing one of the unidentifiable PLMNs, permitting the devices to communicate using channels associated with the cell. In some examples, the PCI may be transmitted to the subset of devices using an RRC Connection Reconfiguration message, which may direct devices to new physical cells.

Figure 9:
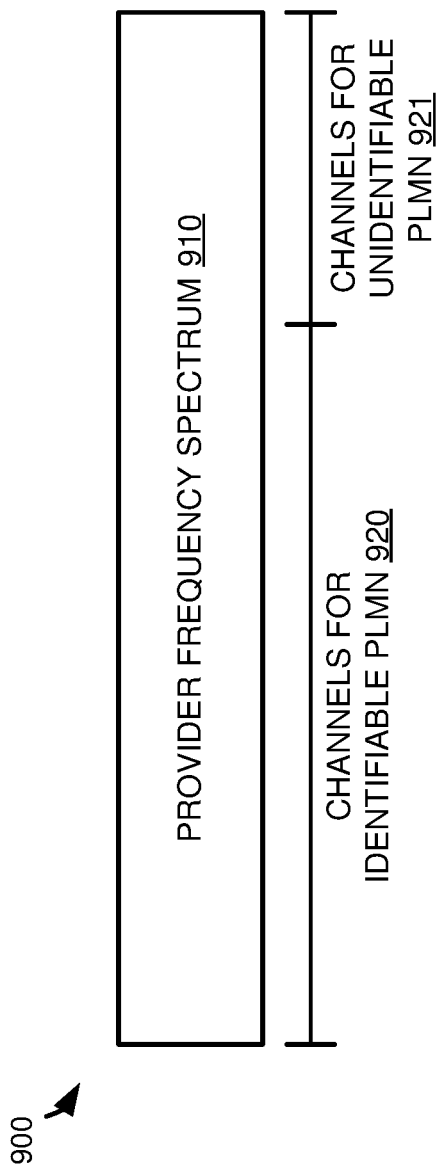
FIG. 9 illustrates a frequency spectrum for a wireless service provider divided using multiple public land mobile networks.

FIG. 9 illustrates a frequency spectrum 900 for a wireless service provider divided using multiple public land mobile networks. Frequency spectrum 900 includes provider frequency spectrum 910, channels for identifiable PLMN 920, and channels for unidentifiable PLMN 921. Although illustrated in the present example with two PLMNs, it should be understood that a service provider might implement any number of PLMNs to provide a desired service.

As described herein, LTE wireless access nodes, including eNodeBs, provide PLMNs to wireless devices, permitting the devices to identify and join the network. Here, the service provider associated with provider frequency spectrum 910 provides two PLMNs to the devices, wherein the PLMNs include a first PLMN associated with a first set of channels in frequency spectrum 910, and a second PLMN associated with a second set of channels in frequency spectrum 910. As the PLMNs are transmitted, wireless devices will scan the frequency spectrum for the PLMNs and compare the received PLMNs to available PLMNs in a data structure on the device. Once compared, the devices will join a PLMN that can be identified via the data structure, which in the present example includes channels for identifiable PLMN 920.

During the communications with the devices, the LTE access nodes may monitor network conditions and transition events to provide additional channels to at least a subset of the communicating devices. Once a network event is identified, an LTE access node will provide a PCI associated with the unidentifiable PLMN to the subset of devices. This would permit the devices to use channels for unidentifiable PLMN 921 for communications in addition to or in place of the channels that were provided with the identifiable PLMN.

Returning to the elements of FIG. 1, WCDs 110-112 may each comprise Radio Frequency (RF) communication circuitry and an antenna. The RF communication circuitry typically includes an amplifier, filter, modulator, and signal processing circuitry. WCDs 110-112 may each include include a user interface, memory device, software, processing circuitry, or some other communication components. WCDs 110-112 may each comprise a telephone, computer, e-book, mobile Internet appliance, wireless network interface card, media player, game console, or some other wireless communication apparatus.

LTE access node 120 may comprise radio frequency (RF) communication circuitry and at least one antenna to provide wireless communication services to WCDs 110-112. The RF communication circuitry typically includes an amplifier, filter, RF modulator, and signal processing circuitry. LTE access node 120 may comprise a router, server, memory device, software, processing circuitry, cabling, power supply, network communication interface, structural support, or some other communication apparatus. LTE access node 120 may comprise an eNodeB in at least one example.

Network 135 may comprise the wireless service provider network, the Internet, IMS, or some other network that provides data services to WCD 110. Communication network 135 may comprise switches, wireless access nodes, Internet routers, network gateways, application servers, computer systems, communication links, or some other type of communication equipment—including combinations thereof.

Wireless signaling 146 uses wireless links that use the air or space as transport media for LTE communication format. Communication link 141 uses metal, glass, air, space, or some other material as the transport media. Communication link 141 could use various communication protocols, such as Time Division Multiplex (TDM), Internet Protocol (IP), Ethernet, communication signaling, wireless communication signaling, or some other communication format—including combinations thereof. Communication link 141 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a wireless access node to serve a wireless communication device over available wireless channels and over hidden wireless channels, the method comprising:

the wireless access node wirelessly transmitting an available Public Land Mobile Network Identifier (PLMN ID) that is associated with the available wireless channels to the wireless communication device, wherein the wireless communication device hosts a data structure indicating that the available PLMN ID is available to the wireless communication device but not that the hidden PLMN ID is available to the wireless communication device;

the wireless access node wirelessly receiving the available PLMN ID from the wireless communication device and responsively exchanging wireless signals with the wireless communication device over the available wireless channels;

the wireless access node identifying a transition condition for the wireless communication device and responsively wirelessly transferring a Physical Cell Identifier (PCI) and the hidden PLMN ID to the wireless communication device, wherein the hidden PLMN ID is associated with the hidden wireless channels and wherein the available wireless channels and the hidden wireless channels comprise different portions of a frequency spectrum; and the wireless access node wirelessly receiving the PCI and the hidden PLMN ID from the wireless communication device and responsively exchanging additional wireless signals with the wireless communication device over the hidden wireless channels.

2. The method of claim 1 wherein identifying the transition condition for the wireless communication device comprises identifying a quality-of-service level for the wireless communication device.

3. The method of claim 1 wherein identifying the transition condition for the wireless communication device comprises identifying a carrier aggregation requirement for the wireless communication device.

4. The method of claim 1 wherein identifying the transition condition for the wireless communication device comprises identifying a capacity value for the wireless access node.

5. The method of claim 1 wherein transferring the PCI to the wireless communication device comprises transferring a Radio Resource Control Connection Reconfiguration message to the wireless communication device.

6. The method of claim 1 wherein transferring the available PLMN ID and the hidden PLMN ID to the wireless communication device comprises wirelessly broadcasting the PLMN IDs.

7. The method of claim 1 wherein the wireless access node comprises a NodeB.

8. The method of claim 1 wherein the wireless access node comprises a Long Term Evolution (LTE) access node.

9. The method of claim 1 wherein the wireless communication device comprises a wireless relay.

10. A wireless access node to serve a wireless communication device over available wireless channels and over hidden wireless channels, the wireless access node comprising:

a wireless communication interface configured to wirelessly transmit an available Public Land Mobile Network Identifier (PLMN ID) that is associated with the available wireless channels to the wireless communication device, wherein the wireless communication device hosts a data structure indicating that the available PLMN ID is available to the wireless communication device but not that the hidden PLMN ID is available to the wireless communication device;

the wireless communication interface configured to wirelessly receive the available PLMN ID from the wireless communication device and responsively exchange wireless signals with the wireless communication device over the available wireless channels;

processing circuitry configured to identify a transition condition for the wireless communication device and responsively identify a Physical Cell Identifier (PCI);

the wireless communication interface configured to wirelessly transfer the PCI and the hidden PLMN ID to the wireless communication device, wherein the hidden PLMN ID is associated with the hidden wireless channels and wherein the available wireless channels and the hidden wireless channels comprise different portions of a frequency spectrum; and the wireless communication interface configured to wirelessly receive the PCI and the hidden PLMN ID from the wireless communication device and responsively exchange additional wireless signals with the wireless communication device over the hidden wireless channels.

11. The wireless access node of claim 10 wherein the transition condition for the wireless communication device comprises a quality-of-service level for the wireless communication device.

12. The wireless access node of claim 10 wherein the transition condition for the wireless communication device comprises a carrier aggregation requirement for the wireless communication device.

13. The wireless access node of claim 10 wherein the transition condition for the wireless communication device comprises a capacity value for the wireless access node.

14. The wireless access node of claim 10 wherein the wireless communication interface is configured to transfer the PCI to the wireless communication device in a Radio Resource Control Connection Reconfiguration message.

15. The wireless access node of claim 10 wherein the wireless communication interface is configured to wirelessly broadcast the available PLMN ID and the hidden PLMN ID to the wireless communication device.

16. The wireless access node of claim 10 wherein the wireless access node comprises a NodeB.

17. The wireless access node of claim 10 wherein the wireless access node comprises a Long Term Evolution (LTE) access node.

18. The wireless access node of claim 10 wherein the wireless communication device comprises a wireless relay.

* * * * *